(12) United States Patent
Xiao et al.

(10) Patent No.: US 11,693,245 B2
(45) Date of Patent: Jul. 4, 2023

(54) WEARABLE AR SYSTEM, AR DISPLAY DEVICE AND ITS PROJECTION SOURCE MODULE

(71) Applicant: Matrixed Reality Technology Co., Ltd., Wuxi (CN)

(72) Inventors: Bing Xiao, Beijing (CN); Xiaobin Liang, Beijing (CN); Chi Xu, Beijing (CN)

(73) Assignee: Matrixed Reality Technology Co., Ltd., Wuxi (CN)

( * ) Notice: Subject to any disclaimer, the term of this patent is extended or adjusted under 35 U.S.C. 154(b) by 134 days.

(21) Appl. No.: 16/930,156

(22) Filed: Jul. 15, 2020

(65) Prior Publication Data

US 2020/0348522 A1  Nov. 5, 2020

Related U.S. Application Data

(63) Continuation-in-part of application No. PCT/CN2019/074868, filed on Feb. 12, 2019.

(30) Foreign Application Priority Data

Feb. 12, 2018 (CN) .......................... 201810146738.7
Feb. 12, 2018 (CN) .......................... 201810146751.2
(Continued)

(51) Int. Cl.
*G02B 27/01* (2006.01)
*G02B 27/28* (2006.01)
(Continued)

(52) U.S. Cl.
CPC ....... *G02B 27/0172* (2013.01); *G02B 27/017* (2013.01); *G02B 1/11* (2013.01);
(Continued)

(58) Field of Classification Search
CPC .. G02B 5/3083; G02B 5/3025; G02B 27/283; G02B 27/286; G02B 5/3016;
(Continued)

(56) References Cited

U.S. PATENT DOCUMENTS 6,215,593 B1  4/2001  Bruce
7,733,572 B1  6/2010  Brown et al.
(Continued)

FOREIGN PATENT DOCUMENTS

CN  1664649 A  9/2005
CN  1743891 A  3/2006
(Continued)

OTHER PUBLICATIONS

Lens Design Fundamentals; Rudolf Kings Lake Academic Press, Inc.; 1978.
(Continued)

*Primary Examiner* — Collin X Beatty
*Assistant Examiner* — Grant A Gagnon
(74) *Attorney, Agent, or Firm* — Kilpatrick Townsend & Stockton LLP

(57) ABSTRACT

The application provides an augmented reality display device comprising a projection source module (10) and an optical path module, wherein the projection source module (10) comprises a projection source (12), the projection source (12) has a curved light outgoing surface (12a), virtual image light (VL) is projected out of the projection source (12) via the curved light outgoing surface (12a), and the optical path module comprises a beamsplitter (20) and a reflector (60), wherein the virtual image light (VL) projected out of the projection source module (10) is incident on the beamsplitter (20), reflected by the beamsplitter (20) onto the reflector (60), reflected by the reflector (60), and then transmitted through the beamsplitter (20), entering a human
(Continued)

eye (E) eventually. The application also provides a wearable augmented reality system comprising the augmented reality display device and a projection source module for the augmented reality display device.

19 Claims, 5 Drawing Sheets

(30) Foreign Application Priority Data

| Feb. 12, 2018 | (CN) | ............... | 201810146905.8 |
| Feb. 12, 2018 | (CN) | ............... | 201810146912.8 |
| Feb. 12, 2018 | (CN) | ............... | 201810146915.1 |
| Feb. 12, 2018 | (CN) | ............... | 201810147325.0 |
| Feb. 12, 2018 | (CN) | ............... | 201810147326.5 |
| Feb. 12, 2018 | (CN) | ............... | 201810147328.4 |
| Feb. 12, 2018 | (CN) | ............... | 201810147330.1 |
| Feb. 12, 2018 | (CN) | ............... | 201810147332.0 |
| Feb. 12, 2018 | (CN) | ............... | 201810147336.9 |

(51) Int. Cl.
*G02B 27/12* (2006.01)
*G02B 1/11* (2015.01)
*G02B 27/09* (2006.01)
*G02B 27/14* (2006.01)

(52) U.S. Cl.
CPC ...... *G02B 27/0101* (2013.01); *G02B 27/0955* (2013.01); *G02B 27/123* (2013.01); *G02B 27/142* (2013.01); *G02B 27/145* (2013.01); *G02B 27/281* (2013.01); *G02B 27/283* (2013.01); *G02B 27/286* (2013.01); *G02B 2027/013* (2013.01); *G02B 2027/0118* (2013.01); *G02B 2027/0178* (2013.01); *G02B 2027/0185* (2013.01)

(58) Field of Classification Search
CPC ...... G02B 27/28; G02B 30/25; G02B 5/3058; G02B 27/281; G02B 1/08; G02B 5/305; G02B 5/23; G02B 5/3033; G02B 5/3041; G02B 26/02; G02B 27/285; G02B 5/0841; G02B 1/02; G02B 1/04; G02B 27/145; G02B 27/288; G02B 27/0093; G02B 6/0055; G02B 6/0056; G02B 6/4246; G02B 26/001; G02B 27/149; G02B 5/1809; G02B 5/3066; G02B 5/3075; G02B 1/06; G02B 5/30; G02B 6/0046; G02B 6/005; G02B 6/0096; G02B 6/272; G02B 1/10; G02B 1/11; G02B 21/0092; G02B 27/0927; G02B 27/1046; G02B 27/1073; G02B 27/144; G02B 27/48; G02B 5/04; G02B 5/0883; G02B 5/26; G02B 5/32; G02B 6/2746; G02B 6/2766; G02B 6/32; G02B 6/34; G02B 6/4208; G02B 6/4214; G02B 1/14; G02B 13/143; G02B 21/0068; G02B 26/105; G02B 27/0101; G02B 27/1006; G02B 30/27; G02B 30/56; G02B 5/00; G02B 6/105; G02B 6/274; G02B 6/2937; G02B 6/2938; G02B 6/305; G02B 6/4206; G02B 6/43; G02B 1/115; G02B 13/24; G02B 17/0892; G02B 19/0028; G02B 2027/012; G02B 21/0016; G02B 23/00; G02B 26/10; G02B 27/0025; G02B 27/022; G02B 27/095; G02B 27/0977; G02B 27/1053; G02B 27/106; G02B 27/108; G02B 27/142; G02B 27/143; G02B 27/642; G02B 3/0056; G02B 5/008; G02B 5/0278; G02B 5/201; G02B 5/3008; G02B 6/12007; G02B 6/126; G02B 6/2713; G02B 6/2773; G02B 6/2848; G02B 6/29302; G02B 6/29311; G02B 6/29362; G02B 6/29395; G02B 6/327; G02B 7/008; G02B 7/182; G02B 1/005; G02B 1/041; G02B 1/12; G02B 13/001; G02B 13/0045; G02B 13/16; G02B 17/00; G02B 17/061; G02B 17/08; G02B 19/0019; G02B 19/0033; G02B 19/0061; G02B 2006/0098; G02B 2006/12097; G02B 2006/12107; G02B 2006/12147; G02B 2006/12152; G02B 2027/0014; G02B 2027/0125; G02B 2027/0132; G02B 2027/0136; G02B 2027/0178; G02B 2027/0194; G02B 21/0004; G02B 21/002; G02B 21/0032; G02B 21/0044; G02B 21/0048; G02B 21/0056; G02B 21/06; G02B 21/125; G02B 21/14; G02B 2207/117; G02B 23/12; G02B 26/00; G02B 26/008; G02B 26/0825; G02B 26/0833; G02B 26/101; G02B 26/12; G02B 26/123; G02B 26/124; G02B 27/0018; G02B 27/0081; G02B 27/0172; G02B 27/02; G02B 27/026; G02B 27/09; G02B 27/0944; G02B 27/0961; G02B 27/0988; G02B 27/0994; G02B 27/1026; G02B 27/1033; G02B 27/1093; G02B 27/123; G02B 27/141; G02B 27/148; G02B 27/18; G02B 27/42; G02B 27/4233; G02B 27/46; G02B 27/60; G02B 3/0012; G02B 3/0043; G02B 3/0062; G02B 3/0087; G02B 3/08; G02B 3/10; G02B 30/26; G02B 30/30; G02B 30/34; G02B 5/003; G02B 5/02; G02B 5/0215; G02B 5/0236; G02B 5/0252; G02B 5/0257; G02B 5/0263; G02B 5/0294; G02B 5/08; G02B 5/124; G02B 5/18; G02B 5/1814; G02B 5/1819; G02B 5/1857; G02B 5/1866; G02B 5/20; G02B 5/28; G02B 5/284; G02B 5/285; G02B 5/287; G02B 5/288; G02B 5/3091; G02B 6/00; G02B 6/0008; G02B 6/0018; G02B 6/0028; G02B 6/003; G02B 6/0038; G02B 6/0051; G02B 6/0053; G02B 6/12011; G02B 6/12014; G02B 6/12023; G02B 6/122; G02B 6/124; G02B 6/14; G02B 6/264; G02B 6/266; G02B 6/2726; G02B 6/276; G02B 6/278; G02B 6/2786; G02B 6/2813; G02B 6/29317; G02B 6/2934; G02B 6/29358; G02B 6/29361; G02B 6/29386; G02B 6/29392; G02B 6/3552; G02B 6/356; G02B 6/3592; G02B 6/3594; G02B 6/3833; G02B 6/42; G02B 6/4204; G02B 9/34
USPC ...................................................... 359/489
See application file for complete search history.

(56) References Cited

U.S. PATENT DOCUMENTS

2003/0169405 A1    9/2003    Agostinelli et al.
2006/0131492 A1    6/2006    Kobayashi et al.

(56) References Cited

U.S. PATENT DOCUMENTS

| | | |
|---|---|---|
| 2009/0109678 A1 | 4/2009 | Hsu et al. |
| 2010/0290127 A1 | 11/2010 | Kessler et al. |
| 2014/0240843 A1 | 8/2014 | Kollin |
| 2015/0301336 A1 | 10/2015 | Denefle et al. |
| 2015/0378074 A1 | 12/2015 | Kollin et al. |
| 2016/0320559 A1 | 11/2016 | Richards |
| 2020/0103659 A1 | 4/2020 | Ouderkirk et al. |
| 2020/0348522 A1 | 11/2020 | Xiao et al. |
| 2020/0348531 A1 | 11/2020 | Popovich et al. |

FOREIGN PATENT DOCUMENTS

| | | | |
|---|---|---|---|
| CN | 101201532 A | 6/2008 | |
| CN | 101418927 A | 4/2009 | |
| CN | 101702045 A | 5/2010 | |
| CN | 101881887 A | 11/2010 | |
| CN | 201946235 U | 8/2011 | |
| CN | 202008041 U | 10/2011 | |
| CN | 102520478 A | 6/2012 | |
| CN | 102540465 A | 7/2012 | |
| CN | 202382166 U | 8/2012 | |
| CN | 202433604 U | 9/2012 | |
| CN | 103207426 A | 7/2013 | |
| CN | 203277499 U | 11/2013 | |
| CN | 103913806 A | 7/2014 | |
| CN | 105093556 A | 11/2015 | |
| CN | 105892058 A | 8/2016 | |
| CN | 205539729 U | 8/2016 | |
| CN | 106019591 A | 10/2016 | |
| CN | 206563849 A | 10/2017 | |
| CN | 206563849 U | 10/2017 | |
| CN | 107422480 A | 12/2017 | |
| CN | 107422481 A | 12/2017 | |
| CN | 107589546 A | 1/2018 | |
| CN | 108181709 A | 6/2018 | |
| CN | 108319019 A | 7/2018 | |
| EP | 1024388 A2 | 8/2000 | |
| GB | 1282425 | 7/1972 | |
| JP | H0659217 A | 3/1994 | |
| JP | H09304730 A | 11/1997 | |
| JP | H10311963 A | 11/1998 | |
| JP | H11237584 A | 8/1999 | |
| JP | H11308640 A | 11/1999 | |
| JP | H11326818 A | 11/1999 | |
| JP | 2002122806 A | 4/2002 | |
| JP | 2002148559 A | 5/2002 | |
| JP | 2005077840 A | 3/2005 | |
| JP | 2007156096 A | 6/2007 | |
| JP | 2008533517 A | 8/2008 | |
| JP | 2010243751 A | 10/2010 | |
| JP | 2012508392 A | 4/2012 | |
| JP | 2017514168 A | 6/2017 | |
| JP | 2017120311 A | 7/2017 | |
| KR | 20080044040 A | 5/2008 | |
| KR | 20140046365 A | 4/2014 | |
| WO | WO 2012/118573 A1 | 9/2012 | |

OTHER PUBLICATIONS

Richard D. Hudson, Jr.; Infrared System Engineering; John Wiley & Sons, Inc. 1969.

Xu et al.; Colorful functional film; Gansu Science & Technology Press; 2012; 5 pages.

Zhang et al.; Principles and Technology of Optoelectronics; Beijing University of Aeronautics and Astronautics Press; 2009; 24 pages.

WEARABLE AR SYSTEM, AR DISPLAY DEVICE AND ITS PROJECTION SOURCE MODULE

CROSS-REFERENCE TO RELATED PATENT APPLICATIONS

This patent application is a continuation-in-part of PCT Application No. PCT/CN2019/074868, filed Feb. 12, 2019, and claims the benefit of Chinese patent application No. 201810146738.7 filed on Feb. 12, 2018; Chinese patent application No. 201810146751.2 filed on Feb. 12, 2018; Chinese patent application No. 201810146912.8 filed on Feb. 12, 2018; Chinese patent application No. 201810146905.8 filed on Feb. 12, 2018; Chinese patent application No. 201810147326.5 filed on Feb. 12, 2018; Chinese patent application No. 201810147336.9 filed on Feb. 12, 2018; Chinese patent application No. 201810147325.0 filed on Feb. 12, 2018; Chinese patent application No. 201810146915.1 filed on Feb. 12, 2018; Chinese patent application No. 201810147330.1 filed on Feb. 12, 2018; Chinese patent application No. 201810147332.0 filed on Feb. 12, 2018 and Chinese patent application No. 201810147328.4 filed on Feb. 12, 2018. The entire teachings and disclosures of the above PCT application and all Chinese patent applications referenced above are incorporated herein by reference thereto.

TECHNICAL FIELD

The present application relates to the field of Augmented Reality (AR) technology. In particular, the present application relates to a wearable AR system, an AR display device, and a projection source module for the AR display device.

BACKGROUND ART

Augmented Reality (AR) technology is a technology that combines and presents a virtual image and real scene in real time. A basic optical principle of the augmented reality technology is to simultaneously project light with real scene information and light with virtual image information into a human eye, so that the information conveyed on the light of the two optical paths is merged in the human eye and a combined image comprised of the real scene and the virtual image is observed by the human eye, achieving an effect of augmented reality.

See-through display devices are key devices in augmented reality systems. Depending on different real scenes, the see-through display devices are classified into video see-through display devices and optical see-through display devices. Common augmented reality glasses or helmets (also known as AR glasses or AR helmets) are examples of the optical see-through AR display devices.

FIG. 1 is an optical schematic diagram of an existing AR display device, which generally comprises a projection source module and an optical path module. The projection source module comprises a projection source 1 and a lens 2 serving as a beam shaping element, and the optical path module comprises a beamsplitter 3 and a curved reflector 4.

The principle that a virtual image can be observed by a human eye is as follows: virtual image light emitted from the projection source 1 is incident into the lens 2 and transmitted through the lens 2, and then exits the lens 2, achieving shaping of the light. The shaped light VL is incident on the beamsplitter 3, and at a beamsplitting side of the beamsplitter 3, a portion of the light is reflected onto a reflecting surface of the reflector 4 (while a portion of the light being transmitted through the beamsplitter 3 and disappearing in an external environment), and reflected by the reflector 4 back onto the beamsplitting side of the beamsplitter 3 again. After being transmitted through the beamsplitter 3, the virtual image light VL enters the human eye E eventually.

In this optical configuration, the light carrying the virtual image information is reflected at least twice and transmitted at least once before entering the human eye. By providing reflection, the configuration can achieve higher imaging quality and larger field of view, but the optical configuration has a larger residual curvature of field, which limits further improvement of the image quality and the field of view.

SUMMARY OF THE INVENTION

An object of the present application is to improve the above-mentioned defects at least to some extent by improving configuration of the projection source module or the reflector, and to provide a novel AR display device and a wearable AR system including the AR display device.

To this end, according to a first aspect of the present application, an augmented reality display device comprising a projection source module and an optical path module is provided, wherein the projection source module comprises a projection source, the projection source has a curved light outgoing surface, virtual image light is projected out of the projection source via the curved light outgoing surface, and the optical path module comprises a beamsplitter and a reflector, wherein the virtual image light projected out of the projection source module is incident on the beamsplitter, reflected by the beamsplitter onto the reflector, reflected by the reflector, and then transmitted through the beamsplitter, entering a human eye eventually, and wherein real light carrying real scene information enters the reflector from its outside and is transmitted through the reflector and the beamsplitter into the human eye.

In an embodiment, the projection source is a single-piece projection source and the single-piece projection source defines the light outgoing surface.

In an embodiment, the light outgoing surface is a concave surface or a convex surface.

According to a second aspect of the present application, an augmented reality display device comprising a projection source module and an optical path module is provided, wherein the projection source module comprises a projection source and a fiber optic panel integrated on the projection source, the fiber optic panel defines a light outgoing surface, and the optical path module comprising a beamsplitter and a reflector, and wherein virtual image light projected out of the projection source module is incident on the beamsplitter, reflected by the beamsplitter onto the reflector, reflected by the reflector, and then transmitted through the beamsplitter, entering the human eye eventually.

In an embodiment, the fiber optic panel has a first side which is bonded to the projection source by glue or optical-cement and an opposite second side, the second side defining the light outgoing surface.

In an embodiment, the light outgoing surface is a concave surface, a convex surface or a planar surface.

In an embodiment, the projection source module further comprises a beam shaping element for receiving the virtual image light emitted from the light outgoing surface and shaping it, the beam shaping element having a first side surface that receives the virtual image light.

In an embodiment, the first side surface of the beam shaping element is spaced apart from the light outgoing surface; or the first side surface of the beam shaping element is face-to-face bonded to the light outgoing surface so that the projection source module forms a unitary piece.

In an embodiment, the projection source module further comprises an intermediate matching component, and the intermediate matching component is face-to-face bonded to both the light outgoing surface and the first side surface, respectively, so that the projection source module forms a unitary piece.

In an embodiment, the intermediate matching component is formed from at least one of a liquid medium, a liquid crystal medium, a semi-solid medium, and a solid medium, optionally wherein the intermediate matching component has a medium refractive index of 1 to 2.7.

In an embodiment, the intermediate matching component is formed from a liquid medium and/or a liquid crystal medium, and the projection source module further comprises a sealing structure for sealing the medium forming the intermediate matching component between the light outgoing surface and the first side surface.

In an embodiment, the beamsplitter is a planar beamsplitter and has a beamsplitting side on which the virtual image light from a projection source module is incident, and the reflector is a curved reflector and has an optical axis.

In an embodiment, the virtual image light reflected by the beamsplitting side of the beamsplitter is directly projected onto a reflecting surface of the reflector, reflected by the reflecting surface, and then directly incident on the beamsplitting side of the beamsplitter again.

In an embodiment, the beamsplitter is a polarizing beamsplitter, and the light path module further comprises a wave plate subassembly disposed between the polarizing beamsplitter and the curved reflector or bonded to the reflecting surface of the reflector, and wherein the virtual image light reflected by the beamsplitting side of the beamsplitter is transmitted through the wave plate subassembly and then projected onto the reflecting surface of the reflector, reflected by the reflecting surface, transmitted through the wave plate subassembly again, and then incident on the beamsplitting side of the beamsplitter.

In an embodiment, the polarizing beamsplitter comprises a polarizing beamsplitting film and/or a polarizing film, and preferably further comprises a substrate.

In an embodiment, the beamsplitting side of the beamsplitter and the optical axis of the reflector form a first angle therebetween, and a normal line of the projection source of the projection source module and the beamsplitting side of the beamsplitter form a second angle therebetween, wherein a range of the first angle is between the second angle −10° and the second angle +10°, and the first angle is greater than 0° and less than 90°, and preferably, wherein the second angle β is between 11° and 79°, preferably between 20° and 70°, more preferably between 30° and 60°, more preferably between 40° and 55°, and most preferably between 40° and 50°.

In an embodiment, the reflector comprises a substrate and a semi-transflective film; or
along an incident direction of the virtual image light incident on the reflector, the reflector comprises an antireflection film, a refractive correction substrate and a semi-transflective film, or the virtual image light, when incident on the reflector, is incident on its semi-transflective film first.

According to a third aspect of the present application, an augmented reality display device comprising a projection source module and an optical path module is provided, wherein the projection source module comprises a projection source, the optical path module comprises a beamsplitter and a reflector, and the reflector comprises an antireflection film, a refractive correction substrate and a semi-transflective film, wherein the virtual image light projected out of the projection source module is incident on the beamsplitter, reflected by the beamsplitter onto the reflector, reflected by the reflector, and then transmitted through the beamsplitter, entering a human eye eventually, and wherein, when incident on the reflector, the virtual image light is first incident on the antireflection film and then incident on the refractive correction substrate and finally incident on the semi-transflective film and reflected by the semi-transflective film, or the virtual image light is first incident on the semi-transflective film when incident on the reflector.

According to a fourth aspect of the present application, a projection source module is provided, wherein the projection source module is a projection source module used for the augmented reality display device.

According to a fifth aspect of the present application, a wearable augmented reality system comprising the augmented reality display device is provided, and preferably the wearable augmented reality system is augmented reality glasses or augmented reality helmets or augmented reality masks.

BRIEF DESCRIPTION OF THE DRAWINGS

The principle of the present application will be described in detail with reference to several embodiments shown in drawings, in order to describe and illustrate the above and other features and advantages of the present application more clearly and thoroughly. It should be understood for those skilled in the art that the embodiments shown in the drawings are only a part of embodiments of the present application given for the purpose of describing and illustrating the principle of the present application, and are not all embodiments of the present application. In order to highlight the principle of the present application, the drawings are not depicted to scale, and only optical principle of the present application are shown. In the drawings.

DETAILED DESCRIPTION OF PREFERRED EMBODIMENTS

Figure 1:
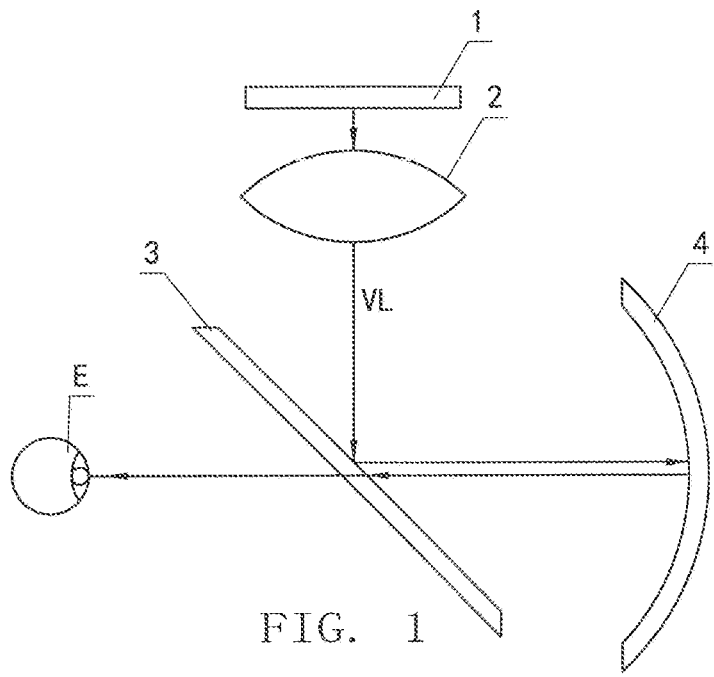
FIG. 1 shows an embodiment of an AR display device in prior art.

A wearable AR system according to the present application can be AR glasses or an AR helmet or an AR mask including an AR display device according to the present application. The AR display device of the present application generally comprises a projection source module and an optical path module. The projection source module is configured for providing light carrying virtual image information (also referred to as virtual image light VL hereinafter), and the optical path module is configured as a combination of optical devices for enabling the virtual image light from the projection source module and scene light from real scene (identified by scene light AL in the drawings and in the following description) to enter a human eye through transmission, reflection, or any combination thereof.

In order to improve the problem of the curvature of field mentioned in the background, it is contemplated to utilize a curved projection source, such as a curved display screen, to replace a planar projection source of a projection source module (FIGS. 2-4), and contemplated to add a fiber optic panel to a planar projection source of a projection source module (FIGS. 5-9).

Implementations and principle of the present application will be described in detail with reference to the accompanying drawings. For easy understanding, components having the same or similar functions or structures are identified by the same reference signs throughout the drawings and description of the present application.

In embodiments of the present application, a projection source module of an AR display device is identified by a reference sign 10, and light VL carrying a virtual image is projected out from the projection source module 10 and enters an optical path module.

Figure 2:
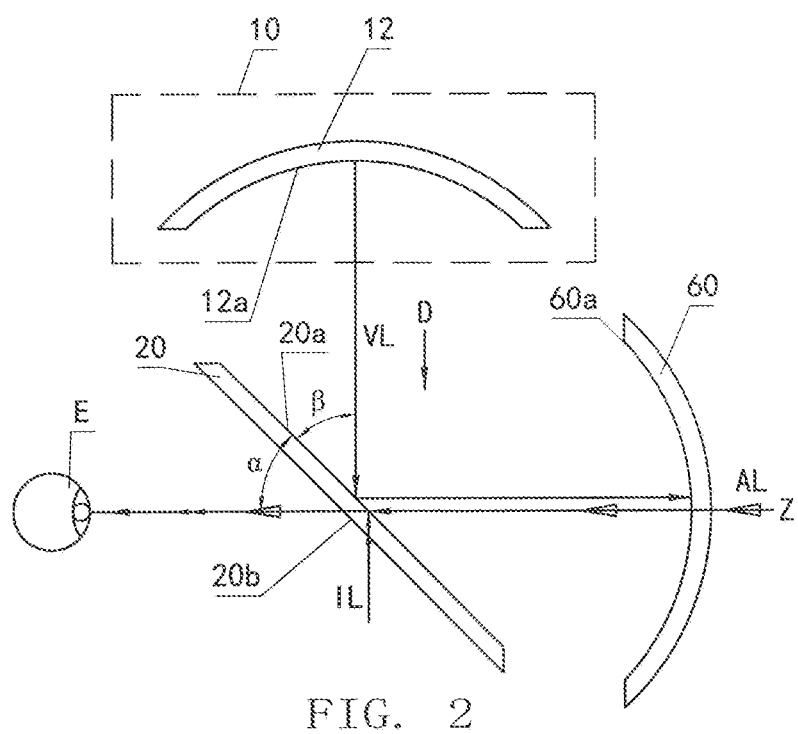
FIG. 2 shows a first embodiment of an AR display device according to the present application, comprising a projection source module constructed according to a first form and an optical path module constructed according to a first form.
Figure 3:
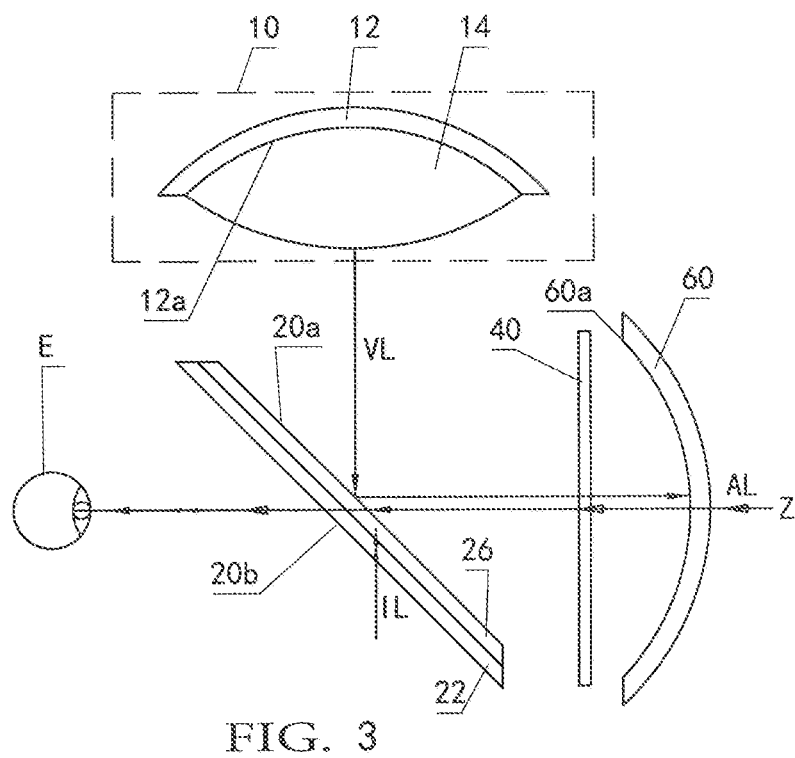
FIG. 3 shows a second embodiment of an AR display device according to the present application, comprising a projection source module constructed according to a first variant of the first form and an optical path module constructed according to a second form.
Figure 4:
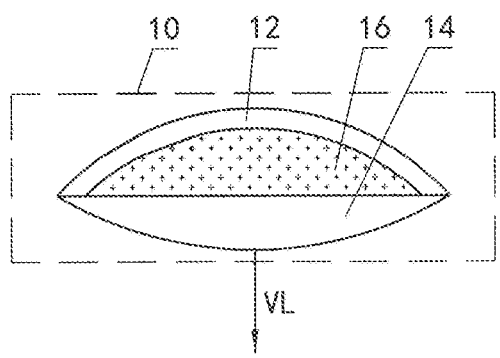
FIG. 4 illustrates a projection source module constructed according to a second variant of the first form.

FIGS. 2-4 illustrate several embodiments of an AR display device comprising a projection source module 10 in a first form, i.e. adopting a curved projection source. In these embodiments, the curved projection source can be matched with an inherent curvature of field of an optical system, to substantially correct the curvature of field. The virtual image light emitted from the curved projection source is not so divergent as the light emitted from the planar projection source in FIG. 1, is relatively concentrated and can be collected efficiently. In addition, due to the light emitted from the projection source being concentrated, lenses in the optical path module can be designed to have a smaller size, and therefore the entire optical system and thus the entire AR display device can be relatively compact.

The AR display device shown in FIG. 2 comprises a projection source module 10 in the first form and an optical path module in a first form.

The projection source module 10 in the first form is provided as a single-piece projection source, and only comprises a projection source 12 having a curved light outgoing surface 12a, the light outgoing surface 12a being a concave surface for emitting virtual image light VL. The single-piece projection source 12 can be any suitable curved projection source known for those skilled in the art, such as a concave display screen, a convex display screen, a cylindrical display screen, an aspheric or free-form display screen.

The optical path module in the first form comprises a beamsplitter 20 and a reflector 60. The beamsplitter 20 of the optical path module is configured as a beamsplitter widely known in the art. The beamsplitter 20 can be a planar beamsplitter or a cubic beamsplitter. In the cases that the beamsplitter is a cubic beamsplitter, it is usually formed with two right angled isosceles triangle prisms, bevels of which are bonded to each other to form a beamsplitting side of the beamsplitter. In the embodiments described with reference to the drawings, the beamsplitter is a planar beamsplitter, the beamsplitting side of the beamsplitter is parallel to a surface of the beamsplitter on which light is incident. The light incident on the beamsplitting side of the beamsplitter is partially reflected and partially refracted, splitting the light into a reflected light portion and a refracted light portion. A beam splitting film or a polarizing beamsplitting film of the beamsplitter defines the beamsplitting side, and the beam splitting film or the polarizing beamsplitting film comprises an effective portion which can be a one-layer or multiple-layer structure having a thickness of tens of nanometers to hundreds of micrometers. In the cases that the polarizing beamsplitting film is used, in addition to the effective portion, it can comprise a base film having a thickness of tens of micrometers to hundreds of micrometers and providing functions of support and protection. In the present specification, although the description is given with regard to the beamsplitting side of the beamsplitter as an example, reflection does not necessarily occur only on the beamsplitting side of the beamsplitter, but can occur within an entire effective thickness of the beam splitting film or the polarizing beamsplitting film of the beamsplitter.

The reflector 60 is configured as a concave reflector known in the art, for example a reflector formed by a semi-transflective film and a substrate. Optionally, the substrate of the reflector has a diopter of 0~800°. Preferably, the reflector 60 can be a semi-reflector so that not only the virtual image light VL from the projection source module can enter a human eye E, but also the real light AL from the real scene can enter the human eye. In one embodiment, the reflector can also be a total reflector so that only the virtual image light VL from the projection source module can enter the human eye E. In the context of the present application, unless otherwise stated, the light received on a reflecting surface of the "reflector" is partially transmitted and partially reflected.

With the AR display device of FIG. 2, the light VL that is projected from the projection source module 10 and, in particular, from the projection source 12 via the light outgoing surface 12a and carries the virtual image information is incident on the beamsplitter 20. At a beamsplitting side 20a of the beamsplitter 20, a portion of the light is reflected, and a portion of the light is refracted into the beamsplitter 20 and then exits the beamsplitter 20, disappearing in an external environment. The reflected light is projected onto the reflector 60, reflected by a reflecting surface 60a of the reflector 60, and then projected onto the beamsplitting side 20a of the beamsplitter 20 again, and after that the light is transmitted through the beamsplitter 20 into the human eye E. Thus, the human eye E can observe the virtual image from the projection source module 10. In the drawings of the present application, the virtual image light VL is indicated by a solid arrow.

The real light AL of the real scene enters the optical path module of the AR display device from an outside of the reflector 60 (a right side of FIG. 2, a side opposite to the reflecting surface 60a), and it is transmitted through the reflector 60 first, incident on the beamsplitting side 20a of the beamsplitter 20, and then transmitted through the beamsplitter 20, entering the human eye E eventually. In this way, the light VL carrying the virtual image information and the real light AL carrying the real scene information simultaneously enter the human eye E, and the human eye E simultaneously observes an image of the real scene and the virtual image.

As described above, the drawbacks of the planar projection source 1 in FIG. 1 are overcome with the curved projection source 12 having the concave light outgoing surface 12a, and the curvature of field of the virtual image observed by the human eye E is corrected to some extent.

FIG. 3 shows a second embodiment of an AR display device, comprising a projection source module constructed according to a first variant of the first form illustrated in FIG. 2 and an optical path module constructed according to a second form.

As a variant or preferred embodiment of the first form, a projection source module 10 of FIG. 3 comprises a projection source 12 also configured as the curved projection source and a beam shaping element 14. The beam shaping element 14 is configured for, among others, integrating virtual image light VL emitted from a light outgoing surface 12a of the projection source 12. In particular, the beam shaping element 14 can be configured as a lens or lens group. The lens or each lens of the lens group can be a positive lens, a negative lens, or any combination of a positive lens and a negative lens, or the like. The lens or lens group forming the beam shaping element 14 can be spherical, aspherical or free-form curved. For example, as shown, the projection source 12 can be a curved projection source having a concave light outgoing surface 12a, and the beam shaping element 14 can be a positive lens.

The projection source 12 and the beam shaping element 14 of the projection source module 10 can be spaced apart from each other, but more preferably, as shown in FIG. 3, the projection source 12 and the beam shaping element 14 are directly face-to-face bonded or integrated together with no gap, to form a unitary piece. The integration can be achieved by any known means such as adhesion or optical cement. Such a configuration can provide at least one of the following advantages: the formed optical configuration is compact, small in size, light in weight, easy to assemble and adjust, high system strength, and comfortable to wear, due to the close-bonding or gap-free structure of the projection source 12 and the beam shaping element 14; a relatively larger numerical aperture can be achieved with a relatively smaller aperture angle and a deflection angle of rim light is decreased, due to the increased refractive index of an image space; and, due to the decreased refractive index difference at an interface of the lens forming the beam shaping element, a transmittance of edge light is improved, ghost images are reduced, and brightness is enhanced.

The optical path module in the second form comprises a beamsplitter 20, a reflector 60, and a wave plate subassembly 40 disposed therebetween. In the illustrated example, the beamsplitter 20 is a polarizing beamsplitter comprising a substrate 22 and a polarizing beamsplitting film 26 bonded to the substrate 22. The polarizing beamsplitting film 26 defines a beamsplitting side 20a for the virtual image light VL, and is configured to allow a polarized light having a polarization state in a first direction to pass or transmit through while reflecting a polarized light having a polarization state in a second direction, wherein the first direction and the second direction are perpendicular to each other.

In an embodiment, the substrate 22 has a diopter of 0~800°.

In the illustrated example, the wave plate subassembly 40 can be a quarter-wave plate configured for converting the incident polarized light in the second direction into a circularly polarized light, and it can be disposed between the beamsplitter 20 and the reflector 60, or can be directly bonded to a reflecting surface 60a of the reflector 60. The wave plate subassembly 40 can have any suitable structure, such as a planar or curved structure, such as a cylindrical structure or a spherical or aspherical structure. In the context of this application, the "wave plate" refers to optical devices capable of producing an additional optical path difference between two polarized lights which have polarization directions perpendicular to each other. It can be a separate device, or a device attached or bonded to other devices. It can be understood by those skilled in the art that the wave plate subassembly 40 can also be configured as other wave plates or retarder films or optical devices as long as they can achieve or substantially achieve the functions of the technical solutions described herein.

Optical principles of the present AR display device will be described below by taking P-polarized light as the polarized light in the first direction and S-polarized light as the polarized light in the second direction as an example. Virtual image light VL projected from the projection source 12 and shaped by the beam shaping element 14 is first incident on the beamsplitting side 20a of the beamsplitter 20 (the polarizing beamsplitting film 26 of the beamsplitter 20). Due to the provision of the polarizing beamsplitting film 26 of the beamsplitter 20, most or nearly all of the S-polarized light of the virtual image light VL is reflected onto the wave plate subassembly 40, and transmitted through the wave plate subassembly 40, being converted to the circularly polarized light to be incident on the reflecting surface 60a of the reflector 60. The circularly polarized light incident on the reflecting surface 60a is reflected by the reflector 60 and then incident on the wave plate subassembly 40 again, where it is converted to the P-polarized light, the polarized light having the polarization state in the first direction. The converted P-polarized light is incident on the beamsplitting side 20a of the beamsplitter 20 again, and the light VL, having the polarization direction in the first direction, is transmitted through the beamsplitter 20 formed by the polarizing beamsplitting film 26 and the substrate 22 into the human eye, enabling the virtual image to be viewed by a user.

It can be understood by those skilled in the art that the polarized lights in the first and second directions do not have to be the P-polarized light and S-polarized light. Optionally, the polarized lights in the first and second directions can be polarized lights having polarization directions at a certain angle with reference to the polarization directions of the P-polarized light and S-polarized light, respectively, as long as the polarization directions are perpendicular to each other. The polarization directions are not specifically limited in the present application.

Similar to the embodiment shown in FIG. 2, real light AL is incident on the reflector 60 from an outside of the reflector 60, after which most of the real light AL passes through the reflector 60, the wave plate subassembly 40 and the beamsplitter 20 sequentially, and enters a human eye E eventually. In this way, the user can view the virtual image and the real outside environment at the same time.

In addition to the technical advantages mentioned above, the design of the polarizing optical path module comprising the polarizing beamsplitting film 26 can provide at least one of the following: an improved utilization of light energy, an enhanced brightness of image light, saved power consumption, and reduced system heat.

It is also contemplated that the projection source 12 and the beam shaping element 14 are integrated into the unitary piece with no gap. They can also be integrated into the unitary piece via an intermediate matching component 16, as shown in FIG. 4.

FIG. 4 illustrates a projection source module 10 constructed according to a second variant of the first form, in which a projection source 12 and a beam shaping element 14 are integrated together via the intermediate matching component 16 to form a unitary piece. In particular, the intermediate matching component 16 is face-to-face bonded to both the projection source 12 and the beam shaping element 14 with no gap, respectively. As for details regarding the projection source 12 and the beam shaping element 14 as well as the technical advantages which can be achieved by integrating the two together, please refer to those described above with respect to FIG. 3.

In the present embodiment, the intermediate matching component 16 can be formed from a matching medium that is different from air and has a refractive index greater than one. The matching medium can be a liquid medium, a liquid crystal medium, a semi-solid medium or a solid medium, and the intermediate matching component can be formed from at least one of the above-described mediums. The liquid medium can be a transparent medium such as water or alcohol. The solid medium can be a transparent solid medium such as glass. For example, the matching medium can include liquid resin and/or semi-solid resin and/or solid resin. The matching medium from which the intermediate matching component 16 is formed can have a refractive index of 1 to 2.7.

Figure 9:
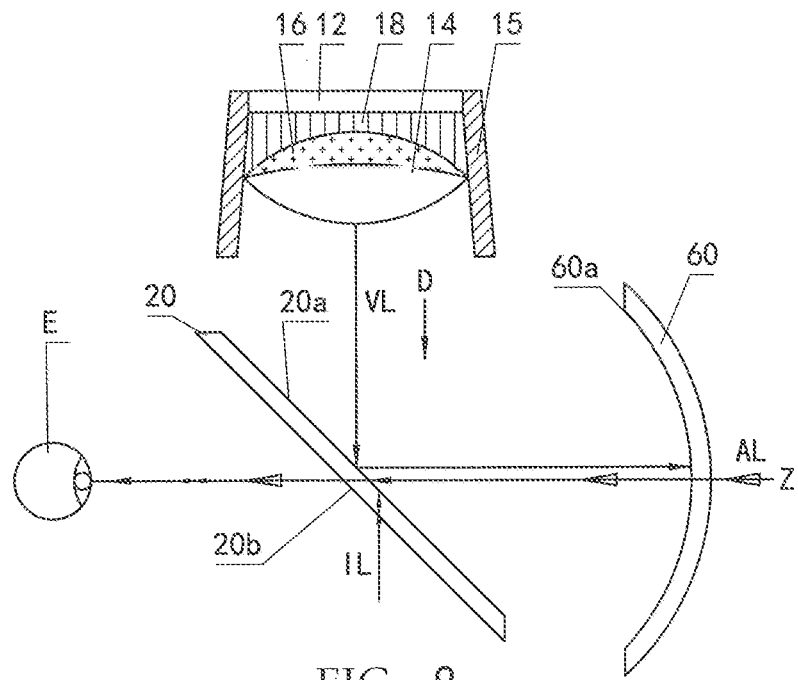
FIG. 9 shows a fifth embodiment of an AR display device according to the present application, comprising a projection source module constructed according to a fifth variant of the second form and an optical path module constructed according to the first form.

In the cases that the matching medium forming the intermediate matching component 16 is a liquid medium or a liquid crystal medium, the projection source 12 and the beam shaping element 14 can be formed to have a shape and size so that the liquid medium or the liquid crystal medium can be sealed therebetween, as shown in FIG. 4. Alternatively, the liquid or liquid crystal medium forming the intermediate matching component 16 can be sealed between the projection source 12 and the beam shaping element 14 by means of an additional sealing structure (as shown in FIG. 9).

Although several embodiments of the AR display device comprising the projection source module in the first form are described above with respect to FIGS. 2-4, it should be understood that the embodiments are not all embodiments that can achieve the functionality. The AR display device of the present application can comprise any structural form of projection source module having the curved projection source, and can comprise an optical path module including any number of, any function of, and any arrangement of optical devices. In addition, it is emphasized that, in order to show as many embodiments as possible, different embodiments shown in different drawings comprise different projection source module configurations and different optical path modules configurations. However, the projection source modules and the optical path modules shown in different drawings can be interchangeably combined to form more embodiments. All AR display devices which comprise a projection source module having the curved projection source are within the scope of the present application and are independent of the optical path module configurations.

As an alternative embodiment of using the curved projection source to correct the curvature of field, FIGS. 5-9 illustrate embodiments in which a fiber optic panel is attached to a planar projection source to correct the curvature of field.

Figure 5:
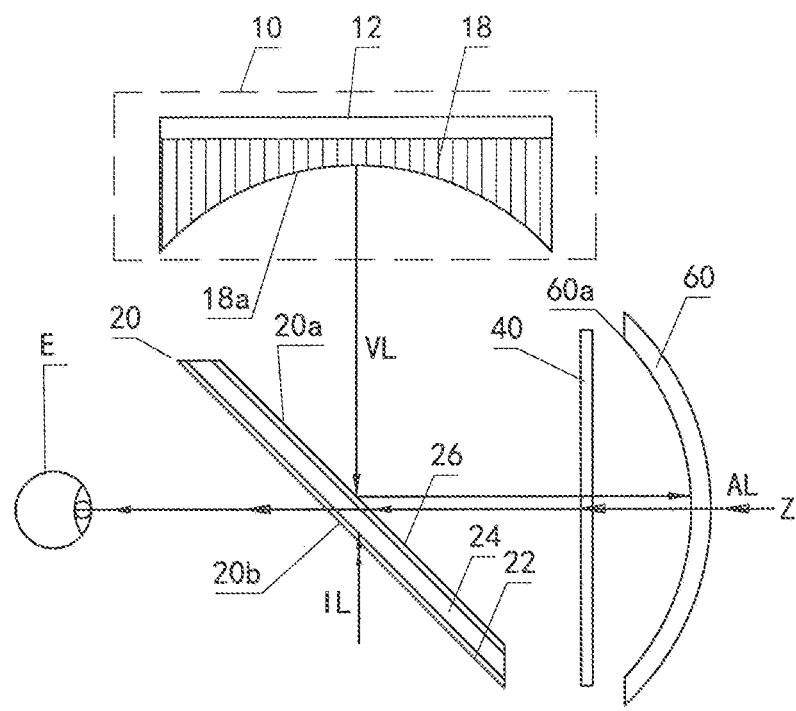
FIG. 5 shows a third embodiment of an AR display device according to the present application, comprising a projection source module constructed according to a second form and an optical path module constructed according to a third form.
Figure 6A:
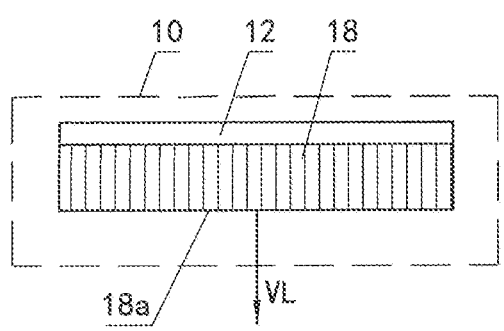
FIGS. 6a-6b show projection source modules constructed according to first and second variants of the second form, respectively.
Figure 6B:
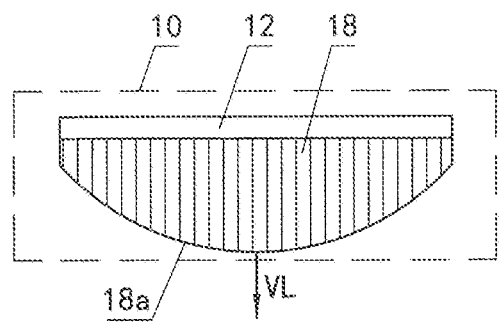

FIG. 5 shows a third embodiment of an AR display device according to the present application, which comprises a projection source module constructed according to a second form and an optical path module constructed according to a third form. The projection source module 10 comprises a projection source 12 and a fiber optic panel 18.

The projection source 12 can be any planar projection source known in the art. Like the beam shaping element 14 shown in FIG. 3, the fiber optic panel 18 is directly face-to-face bonded to the projection source 12 to form a unitary piece. In particular, the fiber optic panel 18 has a first side that is face-to-face bonded to the projection source 12 and an opposite second side that defines a light outgoing surface 18*a*.

The bonding of the first side of the fiber optic panel 18 to the projection source 12 can be achieved by glue. In a possible embodiment, a layer of transparent glue is applied to at least one of the bonding surfaces of the fiber optic panel 18 and the projection source 12, and then any suitable curing method is performed such as coagulation, heating or ultraviolet irradiation, to bond the two components together. In the cases that the bonding surfaces of the first side of the fiber optic panel 18 and the projection source 12 are smooth sufficiently and have a substantially uniform surface shape, the bonding of the two components can be achieved by an optical-cement method with absence of an intermediate medium. The second side of the fiber optic panel 18 can have any shape, such as a concave shape (FIG. 5), a planar shape (FIG. 6*a*), a convex shape (FIG. 6*b*), a cylindrical surface or a freeform curved shape, and the like.

The fiber optic panel 18 comprises optical fibers having a wire diameter of the order of a few or a few hundred microns, or sometimes of the order of sub-microns or millimeters or sub-millimeters. For example, the wire diameter can be much smaller than a size of pixels of the projection source 12 so that each pixel of the projection source 12 corresponds to a plurality of optical fibers and thus the human eye E can not observe boundaries of the pixels through the optical system, which weakens a screen door effect and enables the image to be observed clearly.

When the virtual image light VL enters the fiber optic panel 18 from the projection source 12, the light traveling in various directions is modulated to propagate along the optical fibers in the fiber optic panel 18 and then projected out of the projection source module 10 via the light outgoing surface 18*a* of the fiber optic panel 18. In this way, the fiber optic panel 18 can be selected or designed with regard to the shape of its light outgoing surface 18*a* (e.g. a concave surface in FIG. 5, a planar surface in FIG. 6*a*, and a convex surface in FIG. 6*b*) and distribution of the optical fibers in the fiber optic panel 18, according to a profile of the virtual image light VL that is expected to be projected out of the projection source module 10. This makes it easier to control the virtual image light VL, and the design of the entire optical system comprising the projection source module 10 and the optical path module is simplified. Meanwhile, the fiber optic panel 18 and the projection source 12 are integrated together, which provides improved system integration. The projection source modules 10 shown in FIGS. 5, 6a and 6b differ only in the shape of the light outgoing surface 18a.

As shown, the projection source module 10 formed by adding or attaching the fiber optic panel 18 to the planar projection source 12 can provide the advantage of modulating the light emitted from the projection source 12 as described above. In the cases that the light outgoing surface 18a of the fiber optic panel 18 is curved (for example, the concave surface in FIG. 5, the convex surface in FIG. 6b), the projection source module 10 is similar to the curved projection source described with reference to FIGS. 2-4, and can provide the technical advantages the curved projection source can provide, i.e. matching the light VL with the curvature of field of the optical system and improving the image quality.

An optical path module shown in FIG. 5 is constructed according to a third form of the present application. The optical path module in the third form is different from that in the second form shown in FIG. 3 only in that the beamsplitter 20 further comprises a polarizing film 24, the polarizing film 24 being capable of absorbing light in the second polarization direction (S direction), for example, the portion of the incident light VL that is not reflected by the polarizing beamsplitting film 26. In the present embodiment, the polarizing film 24 is disposed between the substrate 22 and the polarizing beamsplitting film 26. The principle of propagation of the virtual image VL and the real light AL is similar to that described above with respect to FIG. 3 and will not be described again here.

The beamsplitter 20 includes the polarizing film 24, which can reduce interference caused by interfering light IL on the image seen by the human eye E. When the interference light IL is incident on the beamsplitter 20 from the outside via the light outgoing surface 20b of the beamsplitter 20, it is first incident on the polarizing film 24 of the beamsplitter 20. The polarizing film 24 can absorb a portion of the interference light IL which has a polarization direction in the second direction (S direction), with a portion of the interference light IL which has a polarization direction in the first direction (P direction) passing through it, so that substantially no interference light IL enters the human eye E. Without the polarizing film 24, as shown in FIG. 3, the polarized light in the second direction (S-polarized light) of the interference light IL will be reflected by the polarizing beamsplitting film 26 toward the human eye E, causing the interference.

The polarizing film 24 and the polarizing beamsplitting film 26 can be configured so that the virtual image light VL from the projection source module 10 is first incident on the polarizing beamsplitting film 26 and the interference light IL is first incident on the polarizing film 24. On this basis, the substrate 22, the polarizing film 24 and the polarizing beamsplitting film 26 can have different arrangements with regard to their positions, and FIG. 4 merely shows one example. Along an incident direction D of the virtual image light VL, the substrate 22, the polarizing film 24 and the polarizing beamsplitting film 26 may be arranged as 20a-26-24-22 (FIG. 5), or 20a-26-22-24 (not shown), or 22-20a-26-24 (not shown), or 20a-26-24 (not shown, in the cases that the substrate 22 is omitted).

Figure 7:
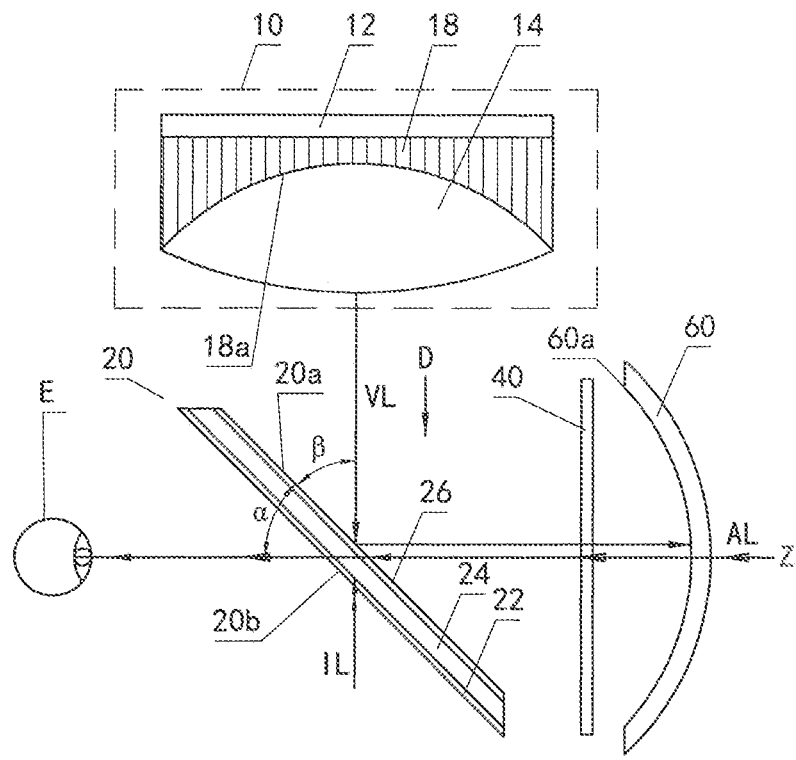
FIG. 7 shows a fourth embodiment of an AR display device according to the present application, comprising a projection source module constructed according to a third variant of the second form and an optical path module constructed according to the third form.

FIG. 7 shows a fourth embodiment of an AR display device according to the present application, comprising a projection source module 10 constructed according to a third variant of the second form and an optical path module constructed according to the third form. Details about the optical path module and the principle of light propagation have been described above with reference to FIG. 5.

As illustrated, the projection source module 10 comprises a planar projection source 12, a fiber optic panel 18, and a beam shaping element 14 for collimating, shaping, and/or combining light emitted from an outgoing surface 18a of the fiber optic panel 18. With regard to the details of the beam shaping element 14, please also refer to the foregoing description. As described above, the planar projection source 12 and the optical fiber panel 18, in combination, can correspond to the aforementioned curved projection source, and thus the planar projection source 12, the optical fiber panel 18 and the beam shaping element 14, in combination, substantially correspond to the projection source module 10 which is integrated and provided as the unitary piece and which is described with reference to FIG. 3.

In particular, a first side of the optical fiber panel 18 is face-to-face bonded to the planar projection source 12 with no gap, and a second side of the optical fiber panel 18 forming the light outgoing surface 18a is face-to-face bonded to an opposite surface of the beam shaping element 14 with no gap.

Figure 8:
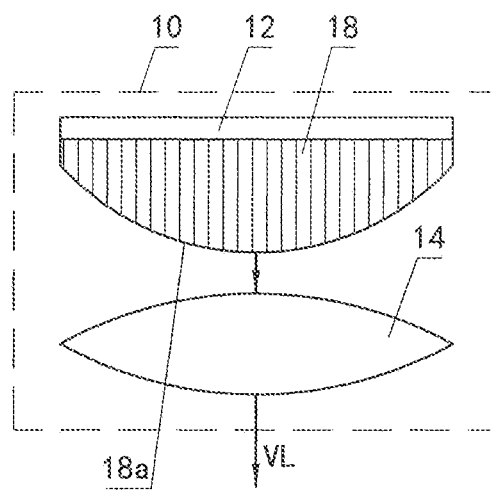
FIG. 8 shows a projection source module constructed according to a fourth variant of the second form.

FIG. 8 shows a projection source module 10 constructed according to a fourth variant of the second form, wherein a curved projection source formed by a planar projection source 12 and a fiber optic panel 18 is provided to be spaced apart from a beam shaping element 14. That is, a light outgoing surface 18a is spaced from the beam shaping element 14 with air.

FIG. 9 shows a fifth embodiment of an AR display device according to the present application, comprising a projection source module 10 constructed according to a fifth variant of the second form and an optical path module constructed according to the first form. Details about the optical path module and the principle of light propagation are described in detail with reference to FIG. 2.

The projection source module 10 of the present embodiment is a further variant of the projection source module shown in FIG. 8. A curved projection source formed by a planar projection source 12 and a fiber optic panel 18 is integrated with a beam shaping element 14 via an intermediate matching component 16. With regard to the intermediate matching component 16 and its advantages, reference can be made to the description above with respect to FIG. 4. A reference sign 15 refers to a sealing structure, such as a sealing frame, which is provided for sealing a liquid or liquid crystal medium forming the intermediate matching component 16 between the curved projection source and the beam shaping element 14.

As above, details about correcting the curvature of field of the optical system of the AR display device by integrating the projection source (the planar projection source as shown or the curved projection source not shown) with the fiber optic panel together have been given.

A sixth embodiment of an AR display device according to the present application, which can comprise a projection source module 10 of any configuration and an optical path module comprising a reflector having a refractive correction function, will be described below with reference to FIG. 10.

The projection source module 10 of the illustrated embodiment comprises a simple planar projection source 12 and a beam shaping element 14 in the form of a lens, which are spaced apart from each other, and further details will not be repeated here. The optical path module in this embodiment is different from the optical path module in the first form in FIG. 2 in that the reflector 60 in this embodiment is the reflector having the refractive correction function.

In particular, the reflector 60 comprises a refractive correction substrate 62 and a semi-transflective film 64 for reflecting light incident thereon. The refractive correction substrate 62, on one hand, can solve the problem of ametropia of a human eye E, and, on the other hand, can correct the curvature of field of the optical system to a certain extent, so that the image can be observed by the human eye more clearly. The refractive correction substrate 62 and the semi-transflective film 64 are disposed so that the virtual image light VL incident on the reflector 60 passes through the refractive correction substrate 62 first and then is incident on the semi-transflective film 64.

In an embodiment, the refractive correction substrate 62 has a diopter of 0~800°.

Figure 10:
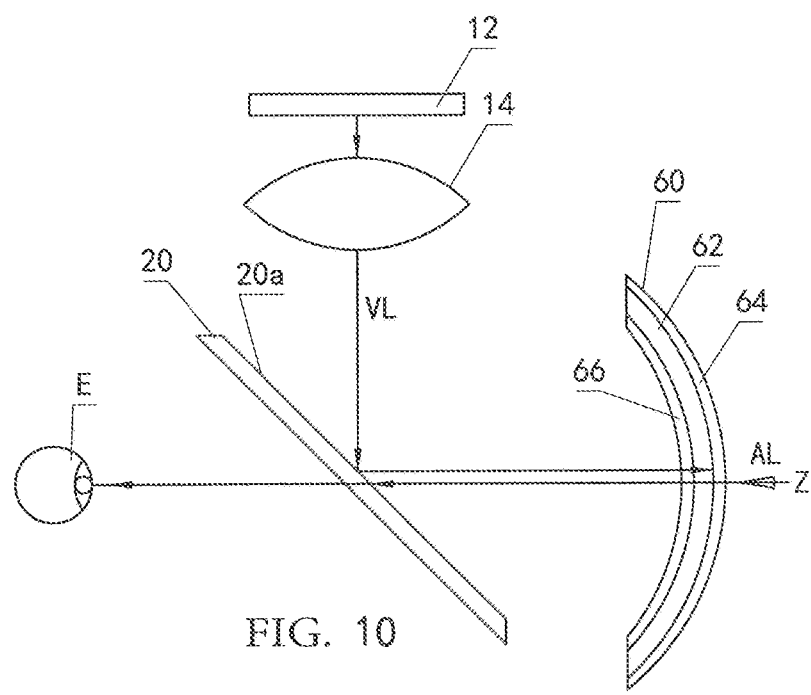
FIG. 10 shows a sixth embodiment of an AR display device according to the present application, comprising an optical path module constructed according to the present application.

In the embodiment of FIG. 10, the reflector 60 further comprises an antireflection film 66, the antireflection film 66 and the semi-transflective film 64 being arranged on opposite sides of the refractive correction substrate 62, respectively, to form the refractive correction reflector together with the refractive correction substrate 62.

With the AR display device of the present embodiment, the semi-transflective film 64 is disposed on an outermost side of the reflector 60 as described above, and thus the curvature of field can be corrected to some extent. Further, due to the provision of the refractive correction substrate 62, an object of correcting a refractive error is achieved for the human eye E when the human eye E observes an image formed by the real light AL. In addition to the advantages mentioned above, the configuration with the refractive correction reflector in FIG. 10 is more advantageous than an existing AR display device having the refractive correction function in that the defects caused by positioning a correcting lens between a beamsplitter and a human eye, such as a complicated structure, an increased weight, more stray light and partially lost brightness, are overcome.

In another embodiment not shown, an antireflection film 66 and a semi-transflective film 64 are disposed on opposite sides of a refractive correction substrate 62, respectively, but the antireflection film 66 is located on an outermost side of the reflector 60 and the semi-transflective film 64 is located on an innermost side of the reflector 60.

Furthermore, the beamsplitting side 20a of the beamsplitter 20, the incident direction D of the virtual image light VL incident on the beamsplitting side 20a from the projection source module, and the concave reflecting surface 60a and an optical axis Z of the reflector 60 are identified in FIGS. 2 and 7. The beamsplitting side 20a of the beamsplitter 20 and the optical axis Z of the reflector 60 form an angle α, and a normal line of the projection source of the projection source module and the beamsplitting side 20a of the beamsplitter 20 form an angle β. A range of the angle α is between β−10° and β+10°, and the angle β is between 11° and 79°, preferably between 20° and 70°, more preferably between 30° and 60°, more preferably between 40° and 55°, and most preferably between 40° and 50°, where the field of view of image light is the largest and a visible range of image light is the largest. Please note that in this application the term "between" means endpoints are included.

Although not identified in other drawings, this arrangement of the beamsplitter 20 is applicable to all AR display devices according to the present application.

The above embodiments are merely some implementations that can implement the present application, and not all possible implementations. It should be understood for those skilled in the art that, within the technical scope disclosed in the present application, any modifications and easily conceived changes can be made to the technical solutions disclosed in the above embodiments and any equivalent substitutions can be made to some technical features. These modifications, changes and substitutions will not cause corresponding technical solutions to depart from the spirit and scope of the technical solutions disclosed in the above embodiments and should be considered as falling within the protecting scope of the present disclosure. The protecting scope of the present invention shall be determined by the protecting scope of the claims.

The invention claimed is:

1. An augmented reality display device comprising:
a projection source module and an optical path module,
wherein the projection source module comprises a planar projection source, a fiber optic panel attached to the planar projection source and having a first side face-to-face bonded to the planar projection source and an opposite second side which defines a light outgoing surface, the light outgoing surface being a concave surface, a beam shaping element, and an intermediate matching component face-to-face bonded to both the light outgoing surface and the beam shaping element, with no gap, virtual image light being projected out of the projection source via the curved light outgoing surface, and
wherein the optical path module comprises a beamsplitter and a reflector,
wherein the virtual image light projected out of the projection source module is incident on the beamsplitter, reflected by the beamsplitter onto the reflector, reflected by the reflector, and then transmitted through the beamsplitter, entering a human eye eventually, and
wherein real light carrying real scene information enters the reflector from its outside and is transmitted through the reflector and the beamsplitter into the human eye.

2. The augmented reality display device according to claim 1, wherein the projection source is a single-piece projection source.

3. An augmented reality display device comprising:
a projection source module and an optical path module,
wherein the projection source module comprises a projection source and a fiber optic panel integrated on the projection source, the fiber optic panel defines a light outgoing surface, and the optical path module comprises a beamsplitter and a reflector,
wherein the fiber optic panel comprises optical fibers having a wire diameter smaller than a size of pixels of the projection source so that each pixel of the projection source corresponds to a plurality of optical fibers, and
wherein virtual image light projected out of the projection source module is incident on the beamsplitter, reflected by the beamsplitter onto the reflector, reflected by the reflector, and then transmitted through the beamsplitter, entering a human eye eventually.

4. The augmented reality display device according to claim 3, wherein the fiber optic panel has a first side which is bonded to the projection source by glue or optical-cement and an opposite second side, the second side defining the light outgoing surface.

5. The augmented reality display device according to claim 3, wherein the light outgoing surface is a concave surface, a convex surface or a planar surface.

6. The augmented reality display device according to claim 3, wherein the projection source module further comprises a beam shaping element for receiving the virtual image light emitted from the light outgoing surface and shaping it, the beam shaping element having a first side surface that receives the virtual image light.

7. The augmented reality display device according to claim 6, wherein the first side surface of the beam shaping element is spaced apart from the light outgoing surface; or
the first side surface of the beam shaping element is face-to-face bonded to the light outgoing surface so that the projection source module forms a unitary piece.

8. The augmented reality display device according to claim 6, wherein the projection source module further comprises an intermediate matching component, and the intermediate matching component is face-to-face bonded to both the light outgoing surface and the first side surface, respectively, so that the projection source module forms a unitary piece.

9. The augmented reality display device according to claim 8, wherein the intermediate matching component is formed from at least one of a liquid medium, a liquid crystal medium, a semi-solid medium, and a solid medium.

10. The augmented reality display device according to claim 8, wherein the intermediate matching component is formed from a liquid medium and/or a liquid crystal medium, and the projection source module further comprises a sealing structure for sealing the medium forming the intermediate matching component between the light outgoing surface and the first side surface.

11. The augmented reality display device according to claim 1, wherein the beamsplitter is a planar beamsplitter and has a beamsplitting side on which the virtual image light from a projection source module is incident, and the reflector is a curved reflector and has an optical axis.

12. The augmented reality display device according to claim 11, wherein the virtual image light reflected by the beamsplitting side of the beamsplitter is directly projected onto a reflecting surface of the reflector, reflected by the reflecting surface, and then directly incident on the beamsplitting side of the beamsplitter again.

13. The augmented reality display device according to claim 11, wherein the beamsplitter is a polarizing beamsplitter, and the light path module further comprises a wave plate subassembly disposed between the polarizing beamsplitter and the curved reflector or bonded to the reflecting surface of the reflector, and wherein the virtual image light reflected by the beamsplitting side of the beamsplitter is transmitted through the wave plate subassembly and then projected onto the reflecting surface of the reflector, reflected by the reflecting surface, transmitted through the wave plate subassembly again, and then incident on the beamsplitting side of the beamsplitter.

14. The augmented reality display device according to claim 13, wherein the polarizing beamsplitter comprises a polarizing beamsplitting film and/or a polarizing film.

15. The augmented reality display device according to claim 14, further comprises a substrate.

16. The augmented reality display device according to claim 11, wherein the beamsplitting side of the beamsplitter and the optical axis of the reflector form a first angle therebetween, and a normal line of the projection source of the projection source module and the beamsplitting side of the beamsplitter form a second angle therebetween, wherein a range of the first angle is between the second angle−10° and the second angle+10°, and the first angle is greater than 0° and less than 90°.

17. The augmented reality display device according to claim 16, wherein the second angle $\beta$ is between 11° and 79°.

18. The augmented reality display device according to claim 1, wherein the reflector comprises a substrate and a semi-transflective film; or
along an incident direction of the virtual image light incident on the reflector, the reflector comprises an antireflection film, a refractive correction substrate and a semi-transflective film, or the virtual image light, when incident on the reflector, is incident on its semi-transflective film first.

19. An augmented reality display device comprising
a projection source module and an optical path module, wherein the projection source module comprises a projection source, the optical path module comprises a beamsplitter and a reflector, and the reflector comprises an antireflection film, a refractive correction substrate and a semi-transflective film,
wherein the virtual image light projected out of the projection source module is incident on the beamsplitter, reflected by the beamsplitter onto the reflector, reflected by the reflector, and then transmitted through the beamsplitter, entering a human eye eventually, and
wherein, when incident on the reflector, the virtual image light is first incident on the antireflection film and then incident on the refractive correction substrate and finally incident on the semi-transflective film and reflected by the semi-transflective film, or the virtual image light is first incident on the semi-transflective film when incident on the reflector.

* * * * *